United States Patent [19]

de Figueiredo et al.

[11] 4,382,973
[45] May 10, 1983

[54] PROCESS FOR THE PRODUCTION OF A FROZEN CHOPPED EGG PRODUCT

[75] Inventors: Mario P. de Figueiredo, Chesterfield; Lawrence R. York, Manchester; James L. Long, Creve Coeur, all of Mo.

[73] Assignee: Ralston Purina Company, St. Louis, Mo.

[21] Appl. No.: 308,709

[22] Filed: Oct. 5, 1981

Related U.S. Application Data

[63] Continuation-in-part of Ser. No. 184,585, Sep. 9, 1980, abandoned.

[51] Int. Cl.³ .............................................. A23L 1/32
[52] U.S. Cl. .................................. 426/614; 426/518; 426/524
[58] Field of Search ..................... 426/614, 524, 518

[56] References Cited

U.S. PATENT DOCUMENTS

| | | | |
|---|---|---|---|
| 2,052,221 | 8/1936 | Dubil | 426/524 X |
| 2,349,465 | 5/1944 | Rupin | 426/524 X |
| 3,232,769 | 2/1966 | Miller | 426/614 X |
| 3,510,315 | 5/1970 | Hawley | 426/614 X |
| 3,561,972 | 2/1971 | Dodge et al. | 426/614 X |
| 3,598,612 | 8/1971 | Ng | 426/614 X |
| 3,598,613 | 8/1971 | Hawley | 426/614 X |
| 4,195,098 | 3/1980 | Otto | 426/524 X |

OTHER PUBLICATIONS

De Gouy, L. P., "The Gold Cook Book" Chilton Book Co., Radnor, Pa, 1947, pp. 152, 153.

Primary Examiner—Robert A. Yoncoskie
Attorney, Agent, or Firm—Virgil B. Hill

[57] ABSTRACT

A cooked and frozen chopped egg product is disclosed which is suitable as a condiment for foodstuffs. The chopped egg product is produced by a process comprising; separately heating egg yolks and whites for a period of time effective to coagulate the yolks and whites to a firm texture followed by freezing of the coagulated yolks and whites. The frozen whites and yolks are chopped at a temperature of about 20°-30° F. to provide a chopped mixture having desirable color and texture without significant smearing of the yolks on the particles of egg whites.

16 Claims, No Drawings

PROCESS FOR THE PRODUCTION OF A FROZEN CHOPPED EGG PRODUCT

This is a continuation-in-part of application Ser. No. 184,585, filed Sept. 9, 1980, now abandoned.

BACKGROUND OF THE INVENTION

The present invention relates to a chopped egg product and a process for producing the same.

Various types of egg products have been produced for consumer use. Raw egg products have been prepared and frozen in order that they may be subsequently thawed and used in the same manner as fresh eggs. More recently, cooked egg products have been produced which are suitable for freezing with subsequent thawing and use. These cooked egg products are very desirable because of the convenience of simply thawing the product to permit use by the consumer. These products and processes for their production are generally described in the following U.S. Patents.

U.S. Pat. No. 3,510,315 describes a cooked egg product in which the yolks are separately cooked in a mold and placed in a larger mold in which the uncooked egg whites are placed and cooked surrounding the yolk. The mixture is frozen and a starch material is included in the whites to provide good freeze-thaw stability. A frozen product with an egg yolk core surrounded by cooked egg white is obtained which can easily be thawed and used by the consumer.

Improvements on the above process for the production of cooked frozen egg products are described in U.S. Pat. No. 3,598,612 in which treatment of the yolk with an oxidizing agent prevents discoloration of the interface area between the yolk and white. U.S. Pat. No. 3,598,613 describes a process in which the yolks are heated to a semi-solid state, ground and then heated to form a solid yolk product. U.S. Pat. Nos. 3,798,336 and 3,711,304 describe processes and apparatus for centering of the yolk body in the egg whites before or during cooking to form a core of egg yolk concentrically surrounded by the cooked whites. These products can be conveniently thawed and sliced and easily used by the consumer without the cooking and peeling of shell eggs.

The above types of cooked, frozen egg products have been extensively used by restaurants because of the ease of preparation. A recent addition to restaurants and institutions engaged in mass feeding in this country, has been the salad bar in which the customer can prepare his own salad with ingredients of his own choosing. A popular ingredient at these salad bars is chopped or diced eggs which can be sprinkled on the salad by the customer. Obviously, the cooking and chopping of eggs requires an extensive amount of preparation, in addition to the fact that chopping usually smears the yolk over the egg white particles resulting in a pasty mess the consumer does not readily associate with chopped eggs. In addition, when whole eggs are cooked, they also suffer from problems with green discoloration of the yolk surface which is visible in a chopped egg product since the particles are exposed by virtue of being chopped or diced.

While the cooked, frozen egg products described above avoid many of the discoloration problems associated with whole eggs, nevertheless, these products also present a poor appearance if they were simply thawed and chopped or diced since the yolk readily smears onto the whites. A need, therefore, exists for a chopped, frozen egg product without significant smearing of the yolks on the whites, which has a smooth texture, and may be readily thawed and used by the consumer as an ingredient in or as a condiment for foods.

It is, therefore, an object of the present invention to provide a cooked and frozen chopped egg product which avoids significant smearing of the yolk on the chopped egg white particles.

It is also an object to provide a cooked and frozen chopped egg product in which the yolk is a bright yellow with an absence of discoloration.

It is also an object to provide a cooked and frozen chopped egg product which has good freeze thaw stability without significant deterioration of the yolk and white during storage.

It is also an object to provide a cooked and frozen chopped egg product which has a smooth but firm texture without significant sticking or clumping of the particles of yolks and whites.

It is a further object to provide a unique process for the production of a cooked and frozen chopped egg product which meets the above objectives which is reliable and convenient to practice.

SUMMARY OF THE INVENTION

These and other objects are achieved in the present invention which provides a unique process for the production of a cooked and frozen chopped egg product.

The present process comprises separate heating of egg yolks and whites to an internal temperature and for a period of time sufficient to coagulate or effectively cook the yolks and the whites. The separately cooked yolks and whites are then frozen. A chopped egg mixture is formed by simultaneously of sequentially chopping the frozen yolks and whites at a critical temperature range of between about 20°-30° F. to provide a chopped egg mixture in which minimal smearing of the yolk on the whites occurs during chopping and the mixture has a smooth but firm texture. The chopped mixture can then be refrozen and sold in this fashion for use by restaurants or institutions as a food condiment. The product represents a distinct improvement over cooked chopped whole eggs in appearance and texture as well as convenience to the user of the product.

A significant factor in the above process which provides the chopped egg product with such desirable appearance and texture is the temperature range at which the simultaneous or sequential chopping of the cooked yolk and white is carried out. For example, if the temperature of the cooked egg during chopping is above this temperature range, extensive smearing of the yolk and the white occurs resulting in a product with an undesirable appearance. By contrast, at a temperature below this range, the yolk and the white tend to shatter or splinter resulting in powder and an excessive amount of fines which will also detract from the appearance of the mixture. Also, the danger of chopper blade breakage and other processing equipment damage increases when the egg product is chopped at temperatures below this range. It should be understood that if the egg product is chopped below these temperatures, not all egg pieces produced will be fines or powder. However, enough product will be of such a small size as to make the process uneconomic for the production of chopped egg pieces.

The separate cooking of the yolks and whites together with chopping at the above temperature results in a frozen diced or chopped egg product that has a desirable color, texture and appearance that can be thawed and used by the consumer.

DESCRIPTION OF THE PREFERRED EMBODIMENT

In accordance with the present invention, pasteurized liquid egg yolks and whites are obtained and placed into separate containers for heating. It is not critical to the present invention that the yolks or whites include additional ingredients although various flavorings, spices, and or seasonings can be included if desired. It is extremely desirable, however, to include a water binding material in the egg whites since the product will be frozen and the addition of the water binding material prevents syneresis during subsequent freezing and thawing of the product. The water binding materials which may be employed in the present invention include polysaccharides or carbohydrates such as colloids, starches, cereals or flours capable of absorbing and binding water. Examples of suitable materials include corn, tapioca, rice and potato starches, flours and the like. Polysaccharides such as algins, carrageenans, xanthan gum or various other colloids are also suitable as water binding materials. Carbohydrates which are particularly preferred are food starches which have good freeze-thaw stability or possess the ability to retain water in the egg white portion after the product has been frozen and subsequently thawed. The water binding materials should be present in the egg white portion in an amount effective to prevent syneresis upon freezing and thawing, typically at levels between about 0.5 and 10% by weight of the egg whites. A preferred level is between about 2 and 4% by weight of the egg whites.

It is also possible, although not critical, to include proteolytic enzymes or other additives in the egg yolk portion as described in U.S. Pat. No. 3,510,315, although such an additive can be omitted entirely.

The yolks and whites are placed in separate containers and heated. The exact type of apparatus or equipment used in the present process is not critical relative to practice of the present invention as long as the egg material is coagulated. Usually, this is done by heating quiescent yolks or whites at temperatures below boiling. Agitation of the egg material while being heated at higher temperatures can produce an unsuitable, soft, uncoagulated texture. A preferred container for heating is to place the yolks and whites in flexible containers or bags for immersion in the cooking baths. This permits easy transfer of the yolks and whites through the testing and freezing steps, followed by easy removal of the frozen yolks and whites from the containers prior to chopping. Heating of the yolks and whites is carried out in a hot water or steam bath at a temperature most often between about 160°–210° F., preferably 170°–185° F., for a period of time sufficient to coagulate or effectively cook the egg yolks and whites to a substantially firm texture and depending on the size of the container, typically about 30–60 minutes.

The heated or cooked yolks and whites are then removed from the cooking bath and cooled to facilitate rapid freezing either by spraying with cool water or dipping the containers into a cool water bath. The heated whites and yolks are then frozen as quickly as possible to a product temperature of about 20°–30° F.

After freezing of the product to the above temperature, the flexible containers with the frozen yolks and whites are briefly warmed to permit easy removal of the frozen yolks and whites from the containers as an integral mass for chopping. This brief period of warming to permit removal from the container does not appreciably alter the temperature of the frozen yolks and whites from the desired range of about 20°–30° F.

The separately cooked, frozen yolks and whites at a temperature range of 20°–30° F., preferably 22°–26° F., are then chopped by simultaneous or sequential feeding of the frozen yolks and whites to a mechanical chopping or cutting device to quickly subdivide the yolks and whites into small particles. It is not critical to the practice of the present process at what weight ratio the yolks and whites are combined during chopping and any weight ratio of whites and yolks may be used. A preferred weight ratio for the chopped egg product is 30–40 parts of yolk to 70–60 parts of white. An especially preferred ratio is about 30 parts of yolk to 70 parts of white since this weight ratio somewhat approximates the ratio of white to yolk normally found in whole eggs. Chopping may be carried out in any type of food cutter or similar device provided the temperature of the product during chopping does not rise above the noted temperature range by excessive heat generation during chopping.

The chopped, cooked egg product is then rapidly refrozen as a mixture even though only partial thawing on the surface of the yolks and whites has taken place during chopping. The chopped product is best frozen while in particulate form before being placed in a container. A preferred, though non-limiting means for quick freezing the chopped yolk and white mixture is by using an individual quick frozen system of any type for quick freezing of the particulate yolks and whites.

The resultant product, because of separate cooking of the yolks and whites, has no discoloration from contact between the two and has a uniform, bright yellow color with separate and identifiable pieces of egg white. The particles of chopped white and yolks are relatively uniform without significant pasting or smearing of the yolk over the surfaces of the egg white particles. The diced product is highly suitable as a condiment for foodstuffs such as salads and represents a significant improvement over similar condiments prepared from cooked shell eggs.

The following Examples will serve to illustrate the present invention by a description by specific embodiments thereof.

EXAMPLE 1

To 56 lbs of pasteurized liquid egg whites is added 8% by weight of modified food starch with the tradename, "Consista", manufactured by A. E. Staley, Decatur, Illinois, and mixed. The liquid egg white containing the starch is proportioned in sausage type casings in about 2 lb. quantities. The bags are sealed and attached to a continuous conveying system for cooking and freezing.

The separated yolks and whites are cooked at a product temperature of 175°–180° F. in a water bath for about 45 minutes until the yolks and whites are coagulated to a firm texture. The bags containing the coagulated yolks and whites are conveyed through a water spray of cool water at 70°–75° F. and cooled.

The coagulated yolks and whites are then placed in a freezer and frozen to a product temperature of 22°–30° F.

The yolks and whites are removed from the flexible bags by brief thawing of the surface of the mass of frozen yolks and whites. 30 parts by weight of the frozen yolks and 70 parts by weight of the frozen whites are placed in a batch type cutting device consisting of a rotating bowl and a set of vertically rotating, high speed cutting blades. The yolks and whites are then chopped for a period of 3 minutes.

The chopped egg product is then refrozen before packaging by being passed through an individually quick frozen system to quick freeze the particles.

The egg product after chopping and freezing, has no significant smearing of the yolks on the particles of egg whites and consisted of relatively uniform and distinct pieces of yolks and whites. The chopped product is highly suitable as a condiment for foodstuffs.

EXAMPLE 2

12 lbs. of liquid egg white is placed in flexible plastic bags in 1 lb. portions and sealed. The bags containing the liquid egg whites are placed into a water bath at a temperature of 185° F. for 20 minutes in order to coagulate the egg white. Separately, 12 lbs. of liquid egg yolk is placed in separate flexible plastic bags in 1 lb. portions and sealed. The containers containing the yolks and whites are placed in a water bath at a product temperature of 185° F. for 20 minutes in order to coagulate the yolks and whites to a substantially firm texture. The coagulated yolks and whites are then placed in a freezer and frozen to a product temperature of 0° F.

To illustrate the importance of the temperature of the frozen product in chopping of the yolks and whites, 12 lbs. of cooked, frozen whites and 12 lbs. of cooked, frozen yolks were tempered in cold water until they reached a temperature of 35° F. The yolks and whites were removed from their containers and placed in a cutter of the type described in Example 1 and chopped for 1 minute. The thawed whites and yolks both lost their identity during chopping and the yolks significantly smeared on the particles of egg white. The smeared product was also difficult to refreeze since significant clumping of the chopped egg product took place.

A 1 lb. portion of the cooked, frozen whites and a 1 lb. portion of the cooked frozen yolks, each at a temperature of 0° F. was removed to a freezer at 20° F., where the product temperature was allowed to equilibrate to 20° F. The yolks and whites at 20° F. were then placed in a water bath and adjusted to a product temperature of 26° F. The yolks and whites were removed from their respective containers and placed in a cutter of the type disclosed in Example 1 and chopped for 1 minute. The yolks and whites chopped into distinct separate pieces without significant smearing of the yolk on the particles of egg white. The chopped egg product could also be easily frozen without undesirable clumping of the product.

A 1 lb. portion of the cooked frozen whites and a 1 lb. portion of the cooked frozen yolks at a temperature of 0° F. placed in a freezer at a temperature of 20° F. where the product temperature was allowed to equilibrate to 20° F. The yolks and whites were removed from their respective casings by brief warming and chopped in a cutter for a period of 1 minute. The yolks and whites had a greater tendency to splinter during the chopping procedure which created more long irregular fragments of product, with a greater amount of fines. However, the proportion of pieces produced that were too small in size was still economically acceptable but as part of a product sold commercially. Later chopping procedures carried out at a temperature of below 15° F. produced about 20% fines and powders, which was deemed commercially unacceptable.

Having described the above invention with reference to these specific embodiments, it is to be understood that numerous variations can be made without departing from the spirit of the invention and it is intended to include such reasonable variations and equivalents within the scope of the present invention.

What is claimed is:

1. A method of forming a chopped egg product comprising:
   a. separately heating egg yolks and egg whites for a period of time effective to coagulate the yolks and whites,
   b. freezing said coagulated yolks and whites,
   c. chopping the frozen whites and yolks at a temperature of between about 20°-30° F. to provide a chopped egg mixture without smearing of the yolks.

2. A method as set forth in claim 1 wherein the yolks and whites are heated to a temperature of between about 160°-210° F.

3. A method as set forth in claim 1 wherein said egg whites include a water binding agent in an amount effective to prevent syneresis during freezing and thawing of said product.

4. A method as set forth in claim 3 wherein the amount of water binding agent is between about 0.5 and 10% by weight of the egg whites.

5. A method as set forth in claim 4 wherein the amount of water binding agent is between about 2 and 4% by weight of the egg whites.

6. A method as set forth in claim 1 wherein the frozen yolks and whites are chopped at a temperature of between about 22°-26° F.

7. A method as set forth in claim 1 wherein the frozen whites and yolks are combined in a weight ratio of 30:40 parts yolks to 70:60 parts whites during chopping.

8. A method as set forth in claim 7 wherein the frozen whites and yolks are combined in a weight ratio of 70 parts of whites and 30 parts of yolks.

9. A method as set forth in claim 1 including the step of refreezing the egg mixture after chopping.

10. A method of forming a cooked, and frozen chopped egg product comprising:
    a. separately heating egg yolks and whites at a temperature of between about 170°-185° F. for a period of time effective to coagulate the yolks and whites,
    b. freezing said coagulated yolks and whites,
    c. chopping the frozen whites and yolks at a temperature of between about 22°-30° F. to provide a chopped egg mixture having a weight ratio of 30:40 parts of yolks to 70:60 parts of whites.

11. A method as set forth in claim 10 wherein said egg whites includes a water binding agent in an amount effective to present syneresis during freezing and thawing of said product.

12. A method as set forth in claim 11 wherein the amount of water binding agent is between about 0.5 and 10% by weight of the egg whites.

13. A method as set forth in claim 12 wherein the amount of water binding agent is between about 2 and 4% by weight of the whites.

14. A method as set forth in claim 10 wherein the frozen yolks and whites are chopped at a temperature of between about 22°-26° F.

15. A method as set forth in claim 11 wherein the frozen whites and yolks are combined in a weight ratio of about 30 parts of yolks and about 70 parts of whites.

16. A method of forming a cooked and frozen chopped egg product comprising:
   a. separately heating egg yolks and whites at a temperature of between about 170°–185° F. for a period of time effective to coagulate the yolks and whites;
   b. freezing said coagulated yolks and whites,
   c. chopping the frozen whites and yolks at a temperature of between about 22°–26° F. to provide a chopped egg mixture having a weight ratio of 30:40 parts of yolks to 60:70 parts of whites; and
   d. refreezing said chopped egg mixture.

* * * * *